Figure 1:
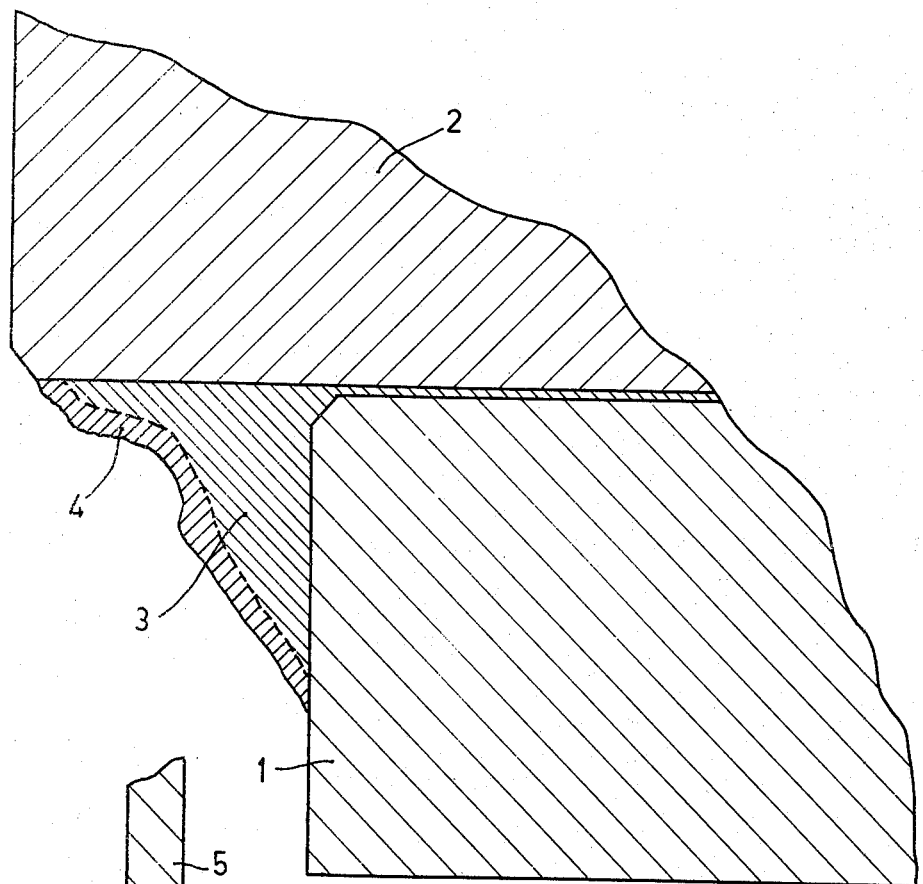

United States Patent
Damsteeg et al.

[11] 3,923,470
[45] Dec. 2, 1975

[54] SOLDERED JOINT

[75] Inventors: Cornelis Jan Damsteeg, Leende; Tjepke Hendrik Ekkelboom, Eindhoven, both of Netherlands

[73] Assignee: U.S. Philips Corporation, New York, N.Y.

[22] Filed: June 27, 1973

[21] Appl. No.: 373,943

[30] Foreign Application Priority Data
July 4, 1972 Netherlands............... 7208332

[52] U.S. Cl. ............ 29/191; 29/494; 29/487
[51] Int. Cl.² ............................ B23P 3/22
[58] Field of Search............ 313/217, 311, 318; 29/25.11, 25.13, 191, 487, 494

[56] References Cited
UNITED STATES PATENTS
2,993,112  7/1961  Feild ............................ 29/182
3,062,948  11/1962  Arnoldy ....................... 29/494 X

*Primary Examiner*—Gerald A. Dost
*Attorney, Agent, or Firm*—Frank R. Trifari; Norman N. Spain

[57] ABSTRACT

A soldered joint between articles of at least one of the high melting point metals, high melting point metal carbides and high melting point metal oxides, which joint comprises titanium in which at least the external surface layer of the soldered joint consists of titanium nitride. The soldered joint is preferably used for securing electrodes for high-pressure gas discharge lamps to current supply conductors.

2 Claims, 2 Drawing Figures

SOLDERED JOINT

The invention relates to a soldered joint between articles consisting mainly of at least one of the high melting point metals, high melting point metal carbides and high melting point metal oxides, which joint comprises titanium. Furthermore the invention relates to an electrode to be used for a high-pressure gas discharge lamp which is secured by means of such a soldered joint to a current supply conductor, and to a high-pressure gas discharge lamp provided with such an electrode. Furthermore the invention relates to a method of manufacturing the said soldered joint.

In the following description and Claims high melting point metals are understood to mean metals having a melting point of more than 2,400°C. High melting point metal carbides and high melting point metal oxides are understood to mean metal carbides and metal oxides having a melting point of more than 2,000°C and exhibiting no noticeable decomposition at the said temperature of 2,000°C. Examples of such materials are tungsten, tantalum, molybdenum, rhenium, osmium, iridium, niobium, tantalum carbide, tungsten carbide and aluminium oxide.

It is known that a joint between tungsten articles can be obtained by making a weld. A zone of molten tungsten is then provided between the articles, which zone forms the joint between the articles after cooling. Such a welded joint is, however, very brittle and weak predominantly because recrystallisation of tungsten in and near the weld occurs due to the very high temperatures which are required for welding.

U.S. Pat. No. 2,993,112 describes a method of welding tungsten articles in which a quantity of titanium is provided on the welding point whereafter the welding point is heated in an inert atmosphere to such a temperature that tungsten near the welding point melts and is mixed with the molten titanium. Although the welded joint obtained in this manner is not brittle itself, it is found that due to the high temperature which is required to melt tungsten a considerable recrystallisation and crystal grain growth of tungsten in the vicinity of the welding point occurs so that the articles have only a slight mechanical strength.

U.S. Pat. No. 3,365,779 describes a method of soldering articles of tungsten to articles of sintered aluminium oxide. A quantity of titanium is then provided on the solder point between the articles whereafter the solder point is heated to a maximum temperature of approximately 1,800°C in an inert atmosphere. Such a soldered joint has a satisfactory mechanical strength. It has, however, the drawback that it is not resistant to temperature approximating the melting point of titanium (approximately 1,800°C). Furthermore it is found that the titanium solder evaporates to a considerable extent at temperatures which are considerably lower than the melting point of titanium.

In many cases it is desirable to have a soldered joint between articles of high melting point material which can be brought to a temperature of, for example, 1,400°–1,600°C without their becoming inadmissibly weak and without leading to a large evaporation of the soldering material. Such a joint might be used, for example, very advantageously for securing an electrode for a high-pressure gas discharge lamp to a current supply conductor.

For securing a tungsten electrode to a tungsten current supply conductor it is known to use a low melting point solder, for example, platinum. The use of platinum has, however, the drawback that the electrode during operation of the lamp easily comes loose, because the soldered joint may reach a temperature of, for example, 1,400°–1,500°C in the lamp. Furthermore the vapour pressure of platinum at these temperatures is inadmissibly high. It is also known to use a high melting point solder, for example, molybdenum having a favourable vapour pressure for the joint between electrode and current supply conductor. The melting point of molybdenum is, however, very high (approximately 2,600°C) so that the required high soldering temperature results in a strong recrystallisation of current supply conductor and/or electrode around the solder point so that a weak electrode construction is obtained.

The object of the invention is to provide a soldered joint between high melting point materials which does not have the above-described drawbacks of the known soldered joints and which can be brought to very high temperatures without any objection.

According to the invention a soldered joint between articles which consist mainly of at least one of the high melting point metals, high melting point metal carbides and high melting point metal oxides, which joint comprises titanium is characterized in that at least the external surface layer of the soldered joint consists of titanium nitride.

A soldered joint according to the invention has a very high mechanical strength. This strength is maintained even at high temperatures. It has been found that this soldered joint does not come loose even at temperatures which are hundreds of degrees higher than the melting point of titanium (approximately 1,800°C). The titanium nitride layer may be relatively thin. The titanium nitride layer in a soldered joint according to the invention has the additional advantage that it provides an eminent protection against the release of titanium vapour. The vapour pressure of titanium nitride itself (melting point approximately 2,950°C) is very low. An important advantage of a soldered joint according to the invention is that it can be obtained at a comparatively low temperature so that the mechanical properties of the articles to be soldered are substantially not affected.

The thickness of the titanium nitride layer in a soldered joint according to the invention may be chosen within very wide limits. However, titanium nitride layers whose thickness is at least 1 $\mu$ are preferred. In fact, it is then ensured that there is a sufficient strength at comparatively high temperatures and a satisfactory protection of the titanium metal in the soldered joint. The soldered joint may consist entirely of titanium nitride.

A very advantageous embodiment according to the invention is an electrode intended for a high-pressure gas discharge lamp which electrode consists mainly of at least one of the metals tungsten and tantalum and is secured by means of a soldered joint according to the invention to a current supply conductor consisting mainly of at least one of the metals tungsten, molybdenum and tantalum. The tungsten and/or tantalum of the electrode material may be mixed or alloyed with, for example, thorium oxide, rhenium or tantalum carbide. Such an electrode according to the invention may be introduced into a lamp at a high temperature without the drawbacks of loosening or of the formation of an unwanted metal vapour.

Such an electrode according to the invention is preferred, which consists of a mainly cylindrical body having a conical or spherical termination for the discharge, in which the end face of the electrode remote from the termination is provided with a hole in which the current supply conductor is secured by means of titanium solder and in which the external surface layer of the solder is converted into titanium nitride. Such an electrode construction has the advantage that it has a very high mechanical strength. For soldering the current supply conductor to the electrode a temperature which is not much higher than the melting point of titanium may be sufficient. Recrystallisation and consequently brittleness of electrode and current supply conductor is then substantially prevented.

An electrode according to the invention is preferably used in a short arc xenon discharge lamp. In such a lamp the electrode construction is subjected to very high thermal and mechanical load. The electrode in the lamp may be an anode or a cathode or, in the case of an AC operated lamp, alternately an anode and a cathode.

The soldered joint, particularly the soldered joint between a current supply conductor and an electrode is preferably manufactured by means of a method according to the invention which is characterized in that a quantity of titanium is provided in the vicinity of the solder point between the articles consisting mainly of high melting point metal, high melting point metal carbide and/or high melting point metal oxide, the solder point being heated in a rare gas atmosphere at a temperature which is higher than the melting point of titanium, the solder point being subsequently heated in a nitrogen-containing atmosphere and finally being cooled.

In a method according to the invention a soldered joint is firstly made with titanium. The solder point is then provided with titanium and is subsequently heated to a temperature which is higher than the melting point of titanium. This heat treatment is to be effected in a rare gas atmosphere so as to avoid contamination of the solder point and premature formation of titanium nitride at the solder point. Soldering with titanium may be performed, for example, by heating the solder point with a high-frequency coil in the rare gas atmosphere until titanium flows. Then a temperature which is not much higher than the melting point of titanium is required for only a short period. After the manufacture of the titanium weld, which has a grey-blue appearance after cooling, the solder point is to be heated in a nitrogen-containing atmosphere. It is advantageous to change over from the heat treatment in a rare gas without any interruption and hence without intermediate cooling to the heat treatment in a nitrogen-containing atmosphere. During the second heat treatment the titanium is superficially nitrated. The thickness of the titanium nitride film then formed is dependent on the temperature and on the nitrogen concentration during nitration and furthermore on the duration of nitration. After cooling, which may be effected, for example, in air, in nitrogen, in an inert or in a reducing atmosphere, the soldered joint having a gold-yellow or bronze coloured appearance is ready.

In a method according to the invention argon is preferably used as a rare gas because this gas is cheap and can be obtained in a very pure form.

In a method according to the invention the heat treatment in a nitrogen-containing atmosphere is preferably effected at a temperature of between 1,600° and 1,900°C for at least 1 second. In fact, the formation of a suitable titanium nitride layer is then ensured. If nitration is effected at temperatures of less than 1,600°C the time required for the formation of a nitride film having a desired thickness for practical uses is too long; temperatures of more than 1,900°C are less desirable because then the mechanical properties of the articles to be soldered may be affected, for example, by recrystallisation.

In a method according to the invention nitrogen or a mixture of nitrogen and hydrogen is preferably chosen as the nitrogen-containing atmosphere because optimum titanium nitride layers can thus be obtained.

The invention will now be further described with reference to some tests and a drawing.

Figure 2:
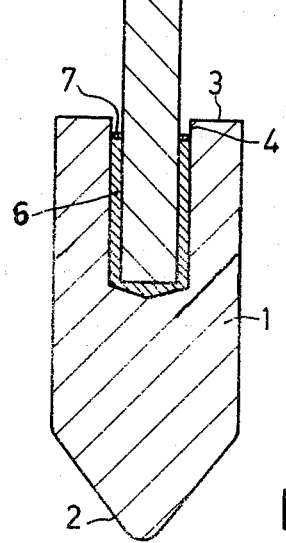

In the drawing;

FIG. 1 is a cross-section of an embodiment of a soldered joint according to the invention and FIG. 2 diagrammatically shows the cross-section of an electrode according to the invention which is suitable for a short-arc xenon discharge lamp.

TEST 1

One end of a tungsten rod having a diameter of 1.7 mms is placed against the end of a tungsten rod having a diameter of 2.5 mms and a thin foil of titanium is provided on the solder point between the ends of the rods facing each other. The solder point is heated by means of a high-frequency furnace while passing through a stream of argon (2 l per minute) until titanium flows. Then a temperature of approximately 1,850°C is reached. The gas stream through the furnace is then replaced by a nitrogen stream (3 l per minute) at which the temperature is maintained constant at 1,850°C. After 8 seconds the furnace is switched off so that the solder point cools. During cooling a stream (4.5 l per min.) of uninflammable mixed gas (a mixture of nitrogen and hydrogen) is passed into the furnace. The soldered joint thus obtained is shown in a cross-section in FIG. 1 of the drawing. This Figure shows a sketch made from a photograph (enlargement approximately 100 x) of a schliff of the soldered joint. In FIG. 1, 1 is the tungsten rod having a diameter of 1.7 mms and 2 is the tungsten rod having a diameter of 2.5 mms. 3 is the titanium solder. The titanium nitride film 4 formed is clearly visible and has a thickness varying between approximately 33 and 62 $\mu$. It is clearly shown that the film 4 constitutes a satisfactorily uninterrupted layer completely covering the titanium solder.

Analogously as described above, a large number of tests was performed during which it was found that the thickness of the nitride film can be chosen within wide limits by suitable choice of the circumstances during nitration (temperature, time, nitrogen concentration).

TEST 2

Two tungsten rods (diameter 1.6 mms) are soldered together at their ends. For this purpose the rods are provided with a quantity of titanium on the solder point and subsequently heated in an argon stream up to a temperature of approximately 1,850°C. Subsequently the rods are maintained for 6 seconds at this temperature in a nitrogen stream and then cooled off. Measurements on the tensile strength (two tests) yielded the values 100 and 124 kg.

For the purpose of comparison the tensile strength was measured on the joint between two similar tungsten rods which had been soldered in the same manner as described above with titanium but in which the heat treatment in nitrogen had not been used. The tensile strength (two tests) in this case was 112 and 114 kg. A tungsten rod having a diameter of 1.6 mms which was subjected to a heat treatment up to approximately 1,850°C (analogous to the above-mentioned heat treatment during soldering) is found to have a tensile strength of 148 kg.

TEST 3

The electrode shown in FIG. 2 has a cylindrical electrode body 1 of thoriated tungsten (tungsten with 1.5% by weight of $ThO_2$) having a diameter of 8 mms. The electrode has a conical tip 2 which serves as a termination for the discharge. The end 3 of the electrode body is provided with an axially located hole 4 having a diameter of 3.5 mms. A tungsten current supply conductor 5 having a diameter of 2.5 mms is secured in the hole 4 by soldering. The soldered joint is obtained by introducing approximately 25 mgs of titanium in the hole 4 and by heating the electrode with its tip down and provided with the current supply conductor 5 in a high-frequency furnace in an argon stream until the titanium melts. Subsequently nitrogen is passed through the furnace for 10 seconds at a temperature of approximately 1,850°C. A titanium nitride film 7 having an average thickness in the order of 50 $\mu$ is then produced on the titanium solder 6.

In order to investigate the temperature resistance of the electrode construction thus obtained, which is suitable for a short-arc xenon discharge lamp, the construction is suspended vertically in a furnace from the current supply conductor with the electrode body pointing downwards and subsequently heated under argon to approximately 2,500° to 2,600°C. It was found that the electrode body did not get loose from the current supply conductor.

Completely analogously as described in the above-mentioned tests relating to soldered joints of articles mainly consisting of tungsten, soldered joints may be manufactured of articles consisting of the other mentioned high melting point materials.

What is claimed is:

1. A soldered joint between articles consisting mainly of at least one of the high melting point metals, high melting point metal carbides and high melting point metal oxides, which joint comprises titanium, wherein at least the external surface layer of the soldered joint consists of titanium nitride.

2. A soldered joint as claimed in claim 1, wherein the titanium nitride layer has a thickness of at least 1 $\mu$.

\* \* \* \* \*

UNITED STATES PATENT AND TRADEMARK OFFICE
CERTIFICATE OF CORRECTION

PATENT NO. : 3,923,470
DATED : December 2, 1975
INVENTOR(S) : CORNELIS JAN DAMSTEEG ET AL It is certified that error appears in the above-identified patent and that said Letters Patent are hereby corrected as shown below:

In the Title Page, Item [30], "7208332" should be

-- 7209332 --.

Signed and Sealed this

Tenth Day of August 1976

[SEAL]

Attest:

RUTH C. MASON
*Attesting Officer*

C. MARSHALL DANN
*Commissioner of Patents and Trademarks*